(12) United States Patent
Hackl et al.

(10) Patent No.: US 8,091,623 B2
(45) Date of Patent: Jan. 10, 2012

(54) AIR MIXER VENT

(75) Inventors: Roland Hackl, Mössingen (DE);
Thorsten Möllert, Stuttgart (DE);
Thomas Zeller, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 1238 days.

(21) Appl. No.: 11/664,409

(22) PCT Filed: Sep. 30, 2005

(86) PCT No.: PCT/EP2005/010589
§ 371 (c)(1),
(2), (4) Date: May 30, 2007

(87) PCT Pub. No.: WO2006/037567
PCT Pub. Date: Apr. 13, 2006

(65) Prior Publication Data
US 2007/0256446 A1     Nov. 8, 2007

(30) Foreign Application Priority Data
Oct. 1, 2004   (DE) .......................... 10 2004 048 344

(51) Int. Cl.
*B60H 1/00* (2006.01)
*F25B 29/00* (2006.01)
(52) U.S. Cl. ............ 165/202; 165/42; 165/43; 165/103; 236/13; 454/156; 454/160; 454/161; 237/12.3 A; 237/12.3 B
(58) Field of Classification Search .................. 165/202, 165/203, 204, 43, 42, 103, 41; 236/13; 454/156, 454/160, 161; 237/12.3 A, 12.3 B
See application file for complete search history.

(56) References Cited

U.S. PATENT DOCUMENTS

| | | | | |
|---|---|---|---|---|
| 5,062,352 A | * | 11/1991 | Ostrand | 165/42 |
| 5,836,813 A | * | 11/1998 | Miyata et al. | 454/906 |
| 6,019,163 A | | 2/2000 | Saida et al. | |
| 6,386,966 B1 | * | 5/2002 | Kuwayama et al. | 454/121 |
| 6,652,372 B2 | | 11/2003 | Müller | |
| 6,736,190 B2 | * | 5/2004 | Natsume et al. | 165/42 |
| 6,852,024 B2 | * | 2/2005 | Seki | 165/43 |
| 6,913,529 B2 | * | 7/2005 | Seki | 165/43 |
| 7,806,172 B2 | * | 10/2010 | Seki et al. | 165/202 |
| 2003/0037918 A1 | | 2/2003 | Lee et al. | |
| 2004/0069484 A1 | | 4/2004 | Tokunaga et al. | |

FOREIGN PATENT DOCUMENTS

| | | |
|---|---|---|
| DE | 195 18 280 A1 | 12/1995 |
| DE | 198 42 875 A1 | 4/1999 |
| DE | 199 16 992 A1 | 4/1999 |
| DE | 199 15 966 A1 | 10/1999 |
| DE | 100 25 334 A1 | 11/2000 |
| DE | 100 31 991 A1 | 1/2002 |
| DE | 101 52 597 A1 | 5/2003 |
| EP | 0 423 778 A2 | 4/1991 |
| EP | 1 095 802 A1 | 5/2001 |

(Continued)

*Primary Examiner* — John Ford
(74) *Attorney, Agent, or Firm* — Foley & Lardner LLP (57) ABSTRACT

The invention relates to an air mixer vent (5), designed in particular for a motor vehicle air conditioning system (1). Said vent comprises an air deflector element (15), which is located on the air mixer vent (5) and protrudes from a surface of said vent (5), the latter (5) being configured as a partially cylindrical vent or having a curved cross-section in relation to the pivoting axis (6).

13 Claims, 8 Drawing Sheets

FOREIGN PATENT DOCUMENTS

| | | |
|---|---|---|
| FR | 1 263 974 | 6/1961 |
| FR | 1 299 630 | 7/1962 |
| FR | 2 771 966 A1 | 6/1999 |
| FR | 2 788 019 A1 | 7/2000 |

* cited by examiner

AIR MIXER VENT

The invention relates to an air mixer vent for ventilation, heating or air conditioning systems in a motor vehicle, in accordance with the precharacterizing clause of claim 1.

DE 198 42 875 A1 discloses an air mixer vent for an air conditioning system of a motor vehicle. In this case, the air conditioning system comprises an evaporator and a heating core, which are arranged approximately horizontally. An air mixer vent for setting the flow ratio between the air passing through the heating core and the air passing through a bypass duct is arranged in the air conditioning system. Air guidance plates for guiding air are formed on the air mixer vent surface arranged at the side of the bypass duct. The air mixer vents here are of essentially flat design and from the one side of which, which is directed toward the bypass duct in the state closing the same, the air guidance plates protrude vertically. A fan is arranged in such a manner that the air is blown approximately horizontally in the air-blowing direction and then flows upward toward the heating core. The air guidance plates guide the air from the front side toward the rear side of the air-blowing direction. The flow distribution and the temperature distribution of the air to be blown toward the passenger compartment can therefore be evened out in the air conditioning system. However, air mixer vents of this type still leave something to be desired.

Starting from this prior art, it is the object of the invention to provide an improved air mixer vent. This object is achieved by an air mixer vent with the features of claim 1. Advantageous refinements of the subject matter of the subclaims.

According to the invention, an air mixer vent is provided, in particular for a motor vehicle air conditioning system, with an air deflector element which is provided on the air mixer vent and protrudes from a surface of the air mixer vent, the air mixer vent being in the form of an essentially partially cylindrical vent or a vent which, in cross section, is of curved design with respect to the pivot axis. In this case, the pivot axis preferably coincides with the center axis of the corresponding cylinder. In the motor vehicle air conditioning system, an air mixer vent of this type is preferably arranged upstream of the air mixer region of the air conditioning system, between the air duct coming from the heater and the bypass duct coming directly from the evaporator, with the air mixer vent regulating both air flows such that, in contrast to DE 198 42 875 A1 mentioned above, only one air mixer vent is required.

By means of the air deflector element, which is fitted or formed on the curved air mixer vent, the regulating behavior can be linearized, and therefore the regulation is simplified and a direct transmission of the adjusting movement—without angle-dependent translation with the aid, for example, of a cam mechanism—is possible. This also has advantages, inter alia, with regard to the regulating curves of right-hand and left-hand drive variants, which obtain a comparable profile by the provision of an air deflector element.

The air deflector element is preferably inclined at an angle of 5° to 45°, in particular 10° to 40°, and particularly preferably 15° to 35°, to the radial direction—with respect to the pivot axis. By means of the corresponding oblique design, the linearity of the ratio of temperature difference and adjustment travel of the air mixer vent is optimized, and therefore the regulating behavior is simplified.

The air deflector element is preferably arranged on the partial cylinder inner surface of the air mixer vent, with, in the case of the air mixer vent during operation, the pivot axis preferably being arranged downstream of the partial cylinder in the direction of flow.

The air deflector element is preferably arranged running parallel to the pivot axis of the air mixer vent, but an oblique profile along the surface of the air mixer vent is also possible and may possibly have additional positive effects on a targeted distribution or swirling of air in the mixing region.

The transition from air mixer vent to air deflector element is preferably of rounded design in the base region, which somewhat improves the air deflector function and, in addition, increases the strength.

If appropriate, apart from the base region—the air deflector element is preferably of rectilinear design, but also a slightly curved profile of the air deflector element is possible in order to optimally deflect the air.

The air deflector element is preferably designed such that it runs between two connecting surfaces of the air mixer vent, which connecting surfaces run perpendicular to the pivot axis, with it being possible for at least one of the connecting surfaces to also be arranged, if appropriate, spaced apart from the corresponding end of the air mixer vent. The connecting surfaces serve here to increase the stability, and therefore the air deflector element may be, for example, configured to be somewhat thinner, thus making savings on material and therefore also on weight possible.

The air deflector element is preferably arranged eccentrically, with it preferably being arranged, in the fitted state, in a manner such that it is easily displaced in the direction of the hot air duct, but the exact arrangement is also dependent on the profile of the hot air duct and cold air duct and on the configuration of the adjoining mixing region.

The air deflector element is preferably arranged such that it runs in relation to the radial direction toward the hot air duct, but, in this case too, the exact arrangement is dependent on the profile of the hot air duct and cold air duct and on the configuration of the adjoining mixing region and, in addition, on the central or eccentric arrangement of the air deflector element.

The air deflector element preferably has a length of at maximum half and at minimum one fifth of the radius of the partial cylinder when center axis and pivot axis coincide, in order optimally to linearize the regulating behavior. In addition, the length is preferably +/−50%, in particular +/−20%, of the distance of the air deflector element in a straight line from the closer end of the air mixer vent, which end runs in the direction of the pivot axis.

Preferably, in particular in the case of long air deflector elements, a rib is provided between the inner circumferential surface of the curved or partially cylindrical vent and a side of the air deflector element. This rib preferably runs in a plane perpendicular to the pivot axis and prevents the air deflector element from collapsing after the injection molding operation. The rib preferably ends essentially in the radial direction with respect to the pivot axis of the vent.

According to a preferred development, the air mixer vent according to the invention is used in a heating and/or air conditioning system, in particular for a motor vehicle, which system comprises at least one of the following components: heat exchanger, heating element, evaporator, filter, mixing chamber, one or more flow ducts and one or more control vents for distributing the air to the outlet ducts.

The invention is explained in detail below using two exemplary embodiments and with reference to the drawing, in which.

Figure 1:
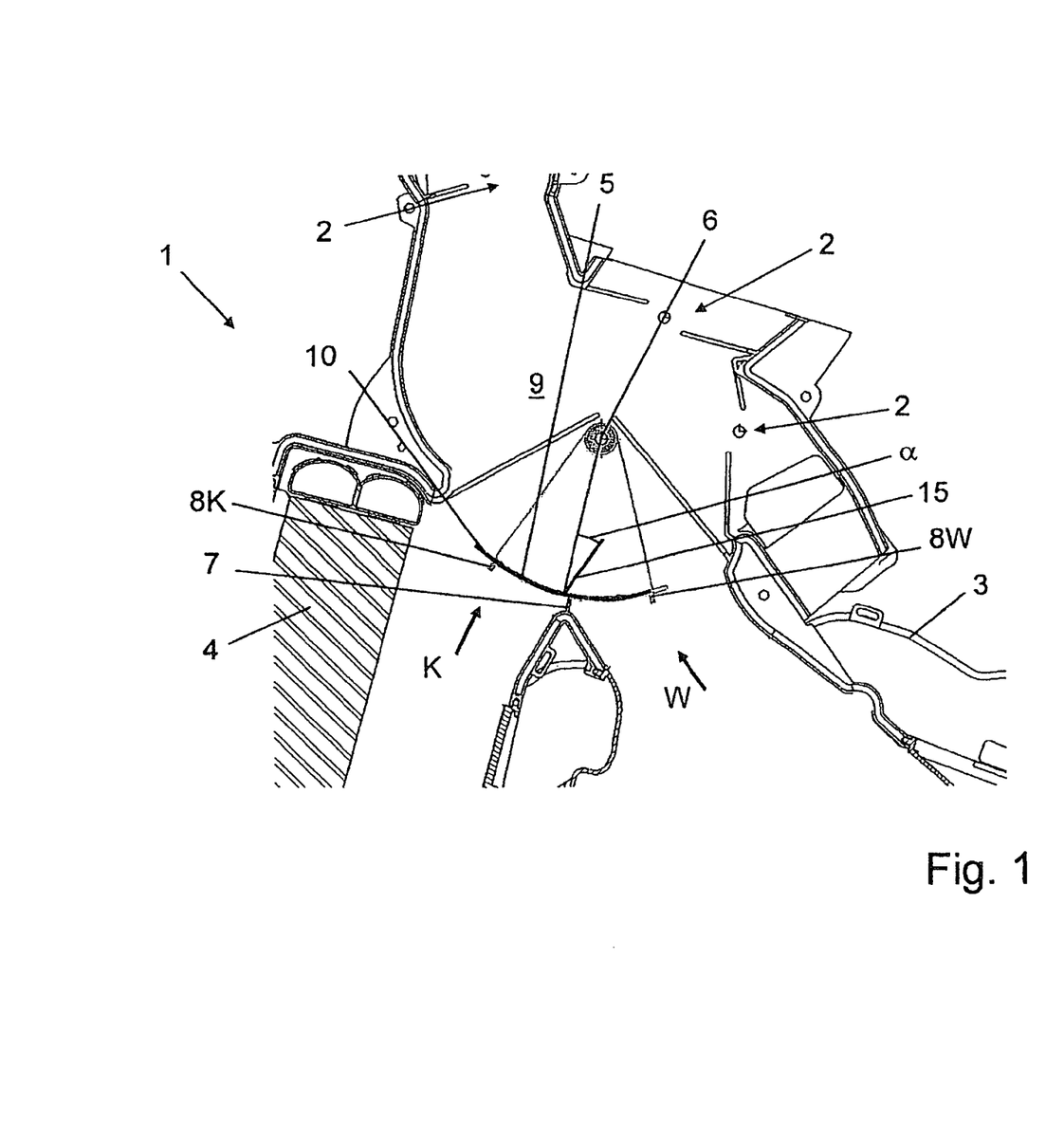
FIG. 1 shows a partially illustrated section through a motor vehicle air conditioning system with an air mixer vent according to the invention in accordance with the exemplary embodiment.

A motor vehicle air conditioning system 1 has a fan (not illustrated) which sucks up air from the surroundings and/or from the vehicle interior and feeds it to the vehicle interior in a temperature-controlled manner via an air duct system, which is indicated by a plurality of openings 2, which can be regulated by means of vents, in the air distributor housing 3, an evaporator 4 and a heater (not illustrated), with, in order to control the temperature of the air fed to the vehicle interior, a partially cylindrical air mixer vent 5 being provided which is illustrated in FIG. 1 in a position in which the cold air stream K coming from the evaporator 4 and the hot air stream W coming from the heater are mixed.

The air mixer vent 5 can be pivoted about a pivot axis 6 which is arranged approximately in the direction of flow as an extension of the wall 7, which separates the cold air stream K and the hot air stream W, parallel to and spaced apart from the same. The pivot axis 6 forms the center axis of the fictitious cylinder, of which the air mixer vent 5 is a segment, and the corresponding part is referred to below as partial cylinder. In the present case, the partial cylinder has a radius of approx. 75 mm, with the segment angle being approx. 70°.

Two edges 8 are provided on the partial cylinder outer surface in a manner running parallel to the pivot axis 6, which edges protrude outward in the radial direction, form sealing surfaces, interact with bearing surfaces on the air distributor housing 3 and, if the need arises, ensure that the cold air duct K or hot air duct W is completely sealed, and no cold or hot air passes into the following mixing space 9 and to the openings 2. In the present case, the edge 8W which is on the hot air duct side is formed directly at the end of the partial cylinder outer surface while the edge 8K which is on the cold air duct side is arranged spaced apart from the corresponding other end of the partial cylinder outer surface such that a lug 10 protrudes, the lug being used to assist the air layering. In addition, sealing lips can be formed on the edges 8, for example can be sprayed on.

Figure 2:
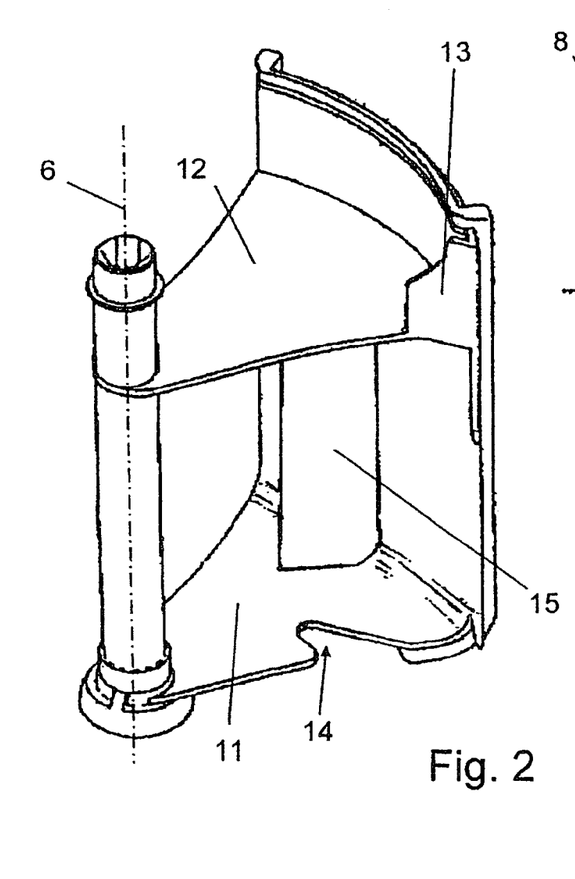
FIG. 2 shows a perspective view of the air mixer vent in accordance with the exemplary embodiment.
Figure 3:
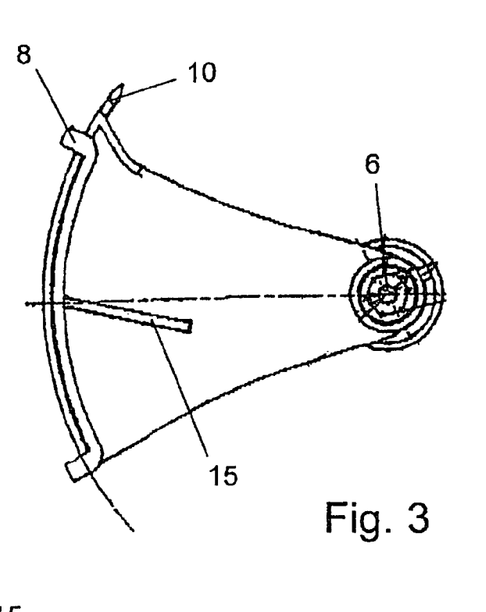
FIG. 3 shows a section transversely to the pivot axis of the air mixer vent from FIG. 2.

Two connecting surfaces 11 and 12 are formed between the pivot axis 6 of the air mixer vent 5 and the partial cylinder, with the connecting surface 11 which is at the bottom of FIG. 2 being arranged approximately at the lower end of the partial cylinder while the upper connecting surface 12 is arranged spaced apart, in the present case at approximately 25% of the overall length of the air mixer vent 5, from the upper end of the partial cylinder. In this case, above the upper connecting surface, a wall 13 is formed running parallel to the pivot axis 6 in an outer region as far as the lug 10 (cf. FIG. 2), the wall 13 not being oriented in the radial direction but rather being oriented inclined at an angle of below 90° with respect to the tangential plane of the partial cylinder in the region in which partial cylinder and wall 13 meet. The lower connecting surface 11 has a cutout 14 which is arranged on the lug side.

On the partial cylinder inner surface, an air deflector element 15 is formed between the upper and the lower connecting surfaces 12 and 11, said air deflector element running parallel to the pivot axis 6 and being formed inclined at an angle α of 15° to the radial direction toward the hot air duct W. In the present case, the length is approx. 30 mm, i.e. somewhat less than half of the radius of the partial cylinder and approximately corresponding to the distance in a straight line from the closer end of the partial cylinder. The air deflector element 15 is arranged approximately centrally between the two edges 8K and 8W.

Figure 4:
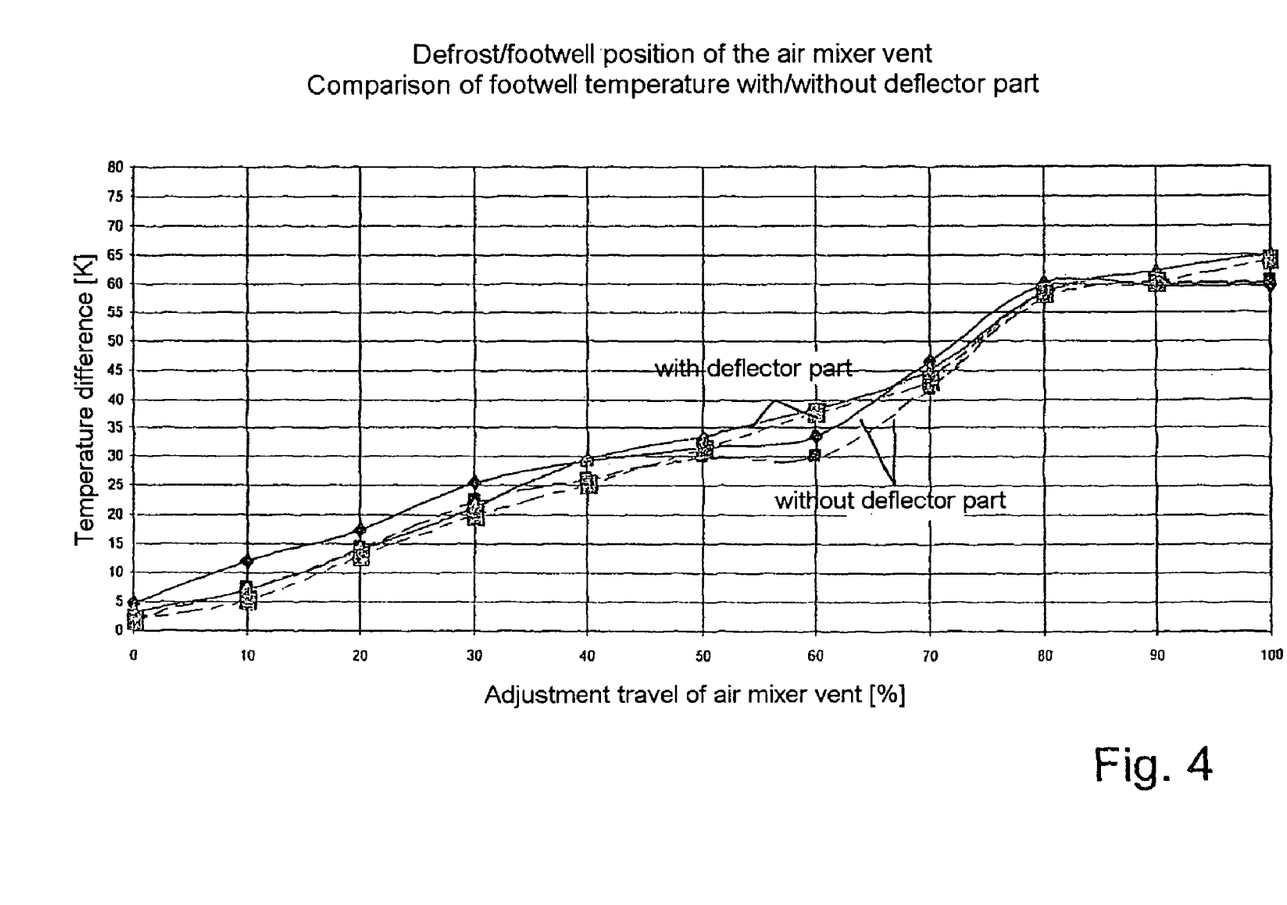
FIG. 4 shows a graph for clarifying the linearization by means of an air deflector element, which is provided on a partially cylindrical air mixer vent, as described in the exemplary embodiment, in comparison to a conventional air mixer vent without an air deflector element, with the temperature differences over the vent adjustment travel each being depicted for the left and right footwell for a defrost/footwell vent position.

FIG. 4 depicts a graph for clarifying the linearization by means of an air deflector element, which is provided on a partially cylindrical air mixer vent, as previously described in the exemplary embodiment, in comparison to a conventional air mixer vent without air deflector element, with the temperature differences over the vent adjustment travel being depicted in each case for the left and right footwell for a vent position of "defrost/footwell" at the openings 2 which can be regulated. As can be seen clearly from the graph, the profile of the curve of the temperature difference over the vent adjustment travel of the air mixer vent with air deflector element (gray triangle with solid line: footwell left, large gray square with X with dashed line: footwell right) is significantly more linear than the curve profile of the air mixer vent without air deflector element (small black diamond with solid line: footwell left, small black square with dashed line: footwell right), thus resulting in a simpler relationship between adjustment travel and temperature and therefore in a simpler regulating capability.

FIGS. 5 to 13 show the second exemplary embodiment of an air mixer vent 105 according to the invention. In this case, parts which are identical to the first exemplary embodiment or act with equivalent effect are provided with reference numbers incremented by 100.

The air mixer vent 105 is arranged in a pivotable manner about its pivot axis 106 in an air distributor housing (not illustrated) which essentially corresponds to that of the first exemplary embodiment, and is therefore not discussed in more detail.

In accordance with the first exemplary embodiment—the pivot axis 106 forms the center axis of a fictitious cylinder, of which the air mixer vent 105 is a segment, and the corresponding part is referred to below as a partial cylinder. In the present case, the partial cylinder has a radius of approx. 76 mm, with the segment angle being approx. 70°.

Two edges 108, which protrude outward in the radial direction and form sealing surfaces, and a further edge 108, which protrudes in the axial direction on the one side surface and forms sealing surfaces, are provided on the partial cylinder outer surface, in a manner such that they run parallel to the pivot axis 106, and are sprayed, consisting of a softer material, onto the air mixer vent 105. These edges 108 interact with bearing surfaces on the air distributor housing and, if the need arises, ensure that the cold air duct K or hot air duct W is completely sealed, and no cold or hot air passes into the following mixing space and to the openings. In the present case, the edge 108W which is on the hot air duct side is formed directly at the end of the partial cylinder outer surface (edge 108W which is arranged at the bottom in FIG. 8 and illustrated in detail in FIGS. 10 and 11) while the edge 108K which is on the cold air duct side is arranged spaced apart from the corresponding other end of the partial cylinder outer surface such that again a lug 110 protrudes and is used to assist the air layering. In addition, sealing lips 108' are provided on the edges 108. The sealing lips 108' run approximately parallel to the outer surface of the air mixer vent 105, with, in the present case, the outwardly protruding sealing lip 108'a being of significantly shorter design than the inwardly protruding sealing lip 108'i.

Figures 12, 13:
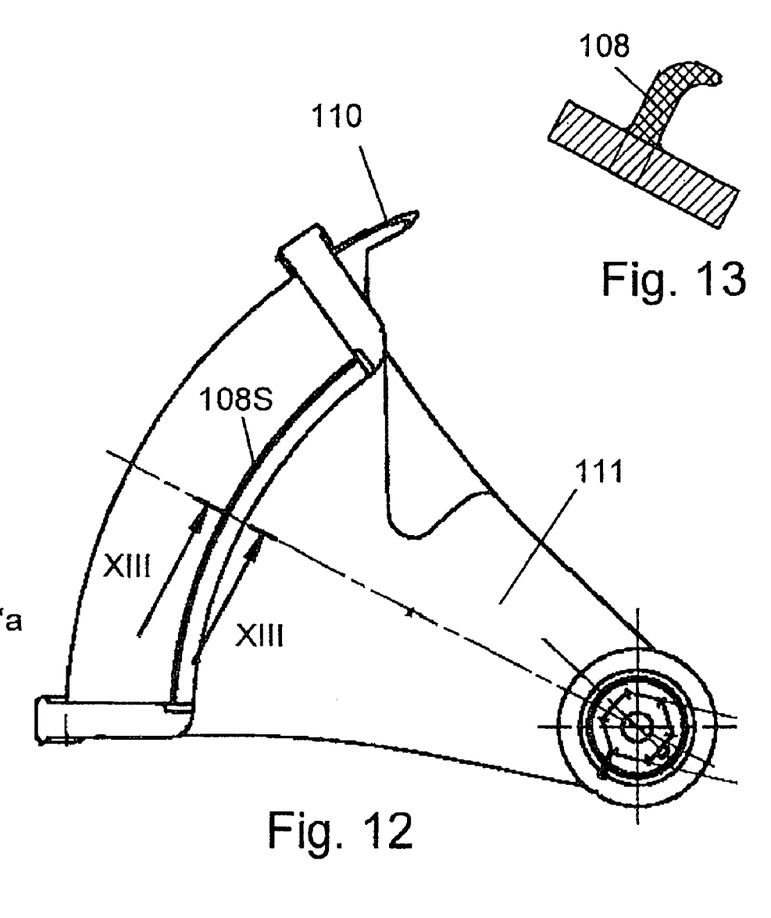
FIG. 12 shows a further side view.
FIG. 13 shows a section along line XIII-XIII in FIG. 12.

Furthermore, the previously mentioned, further edge 108S, which is illustrated in detail in FIG. 13, is formed on one of the side surfaces of the air mixer vent 105, which side surfaces are formed by the connecting surfaces 111. The further edge 108S runs in the circumferential direction of the air mixer vent 105 and ends in a curved manner, with the end of the edge 108S running approximately parallel to the side surface and the excess length approximately corresponding to the thickness of the edge 108S.

Figures 5, 6:
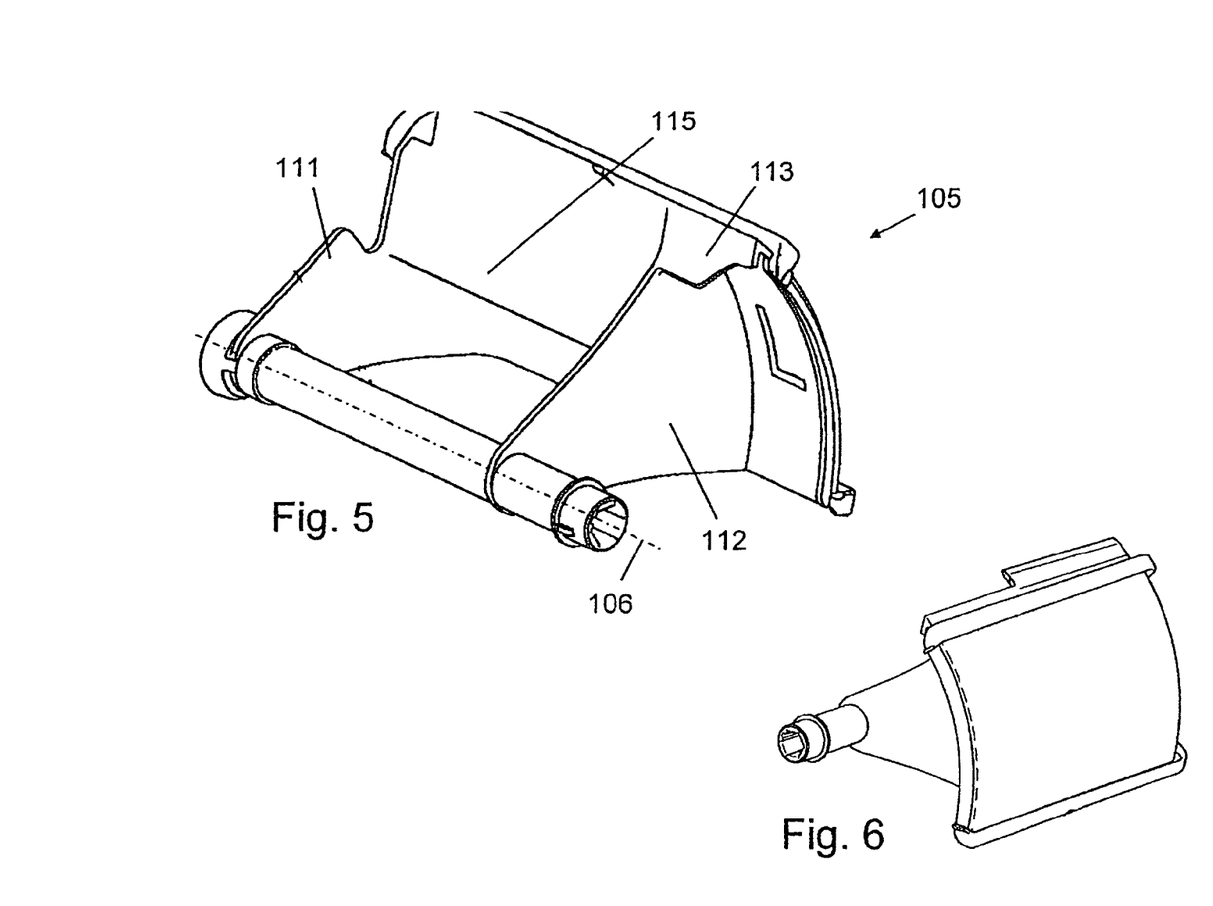
FIG. 5 shows a perspective view of an air mixer vent in accordance with the second exemplary embodiment.
FIG. 6 shows a different perspective view of the air mixer vent from FIG. 5.
Figure 7:
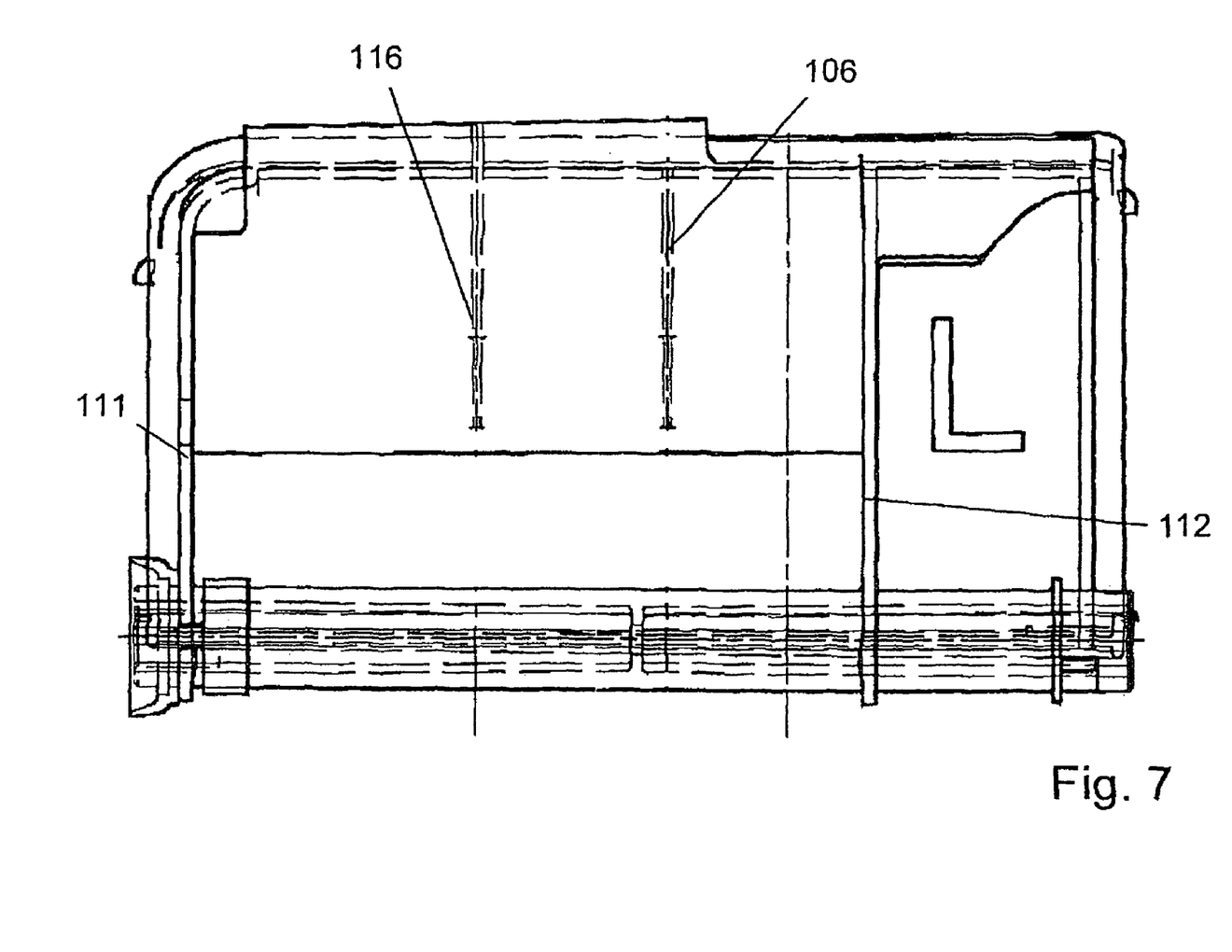
FIG. 7 shows a lateral view of the air mixer vent of FIG. 5.
Figure 8:
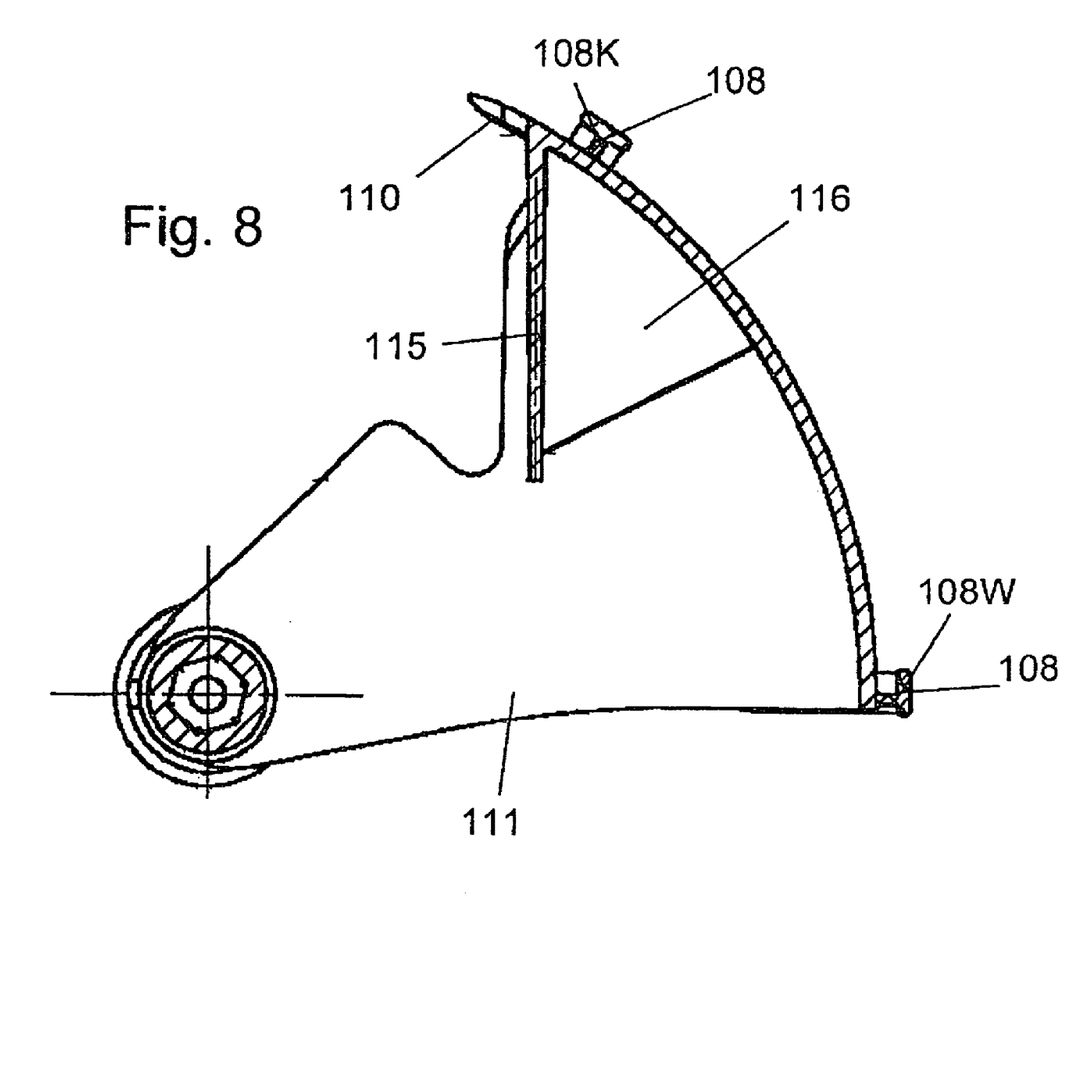
FIG. 8 shows a section along line VIII-VIII in FIG. 7.
Figure 9:
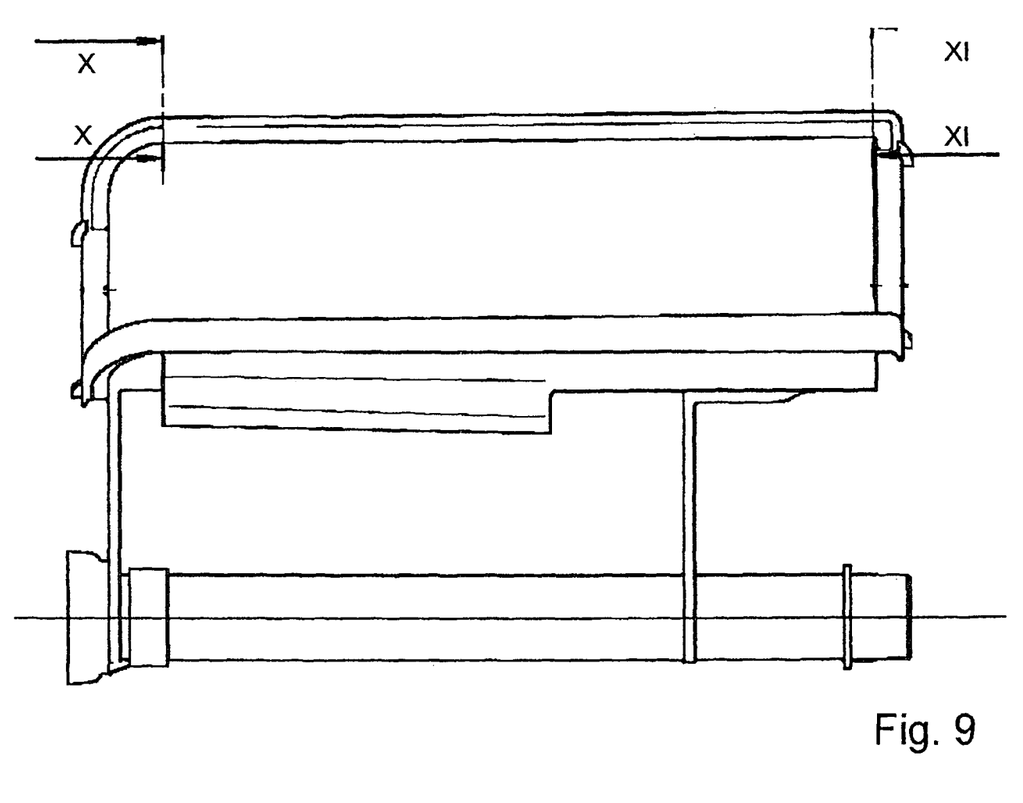
FIG. 9 shows a different lateral view of the air mixer vent from FIG. 5.
Figure 10:
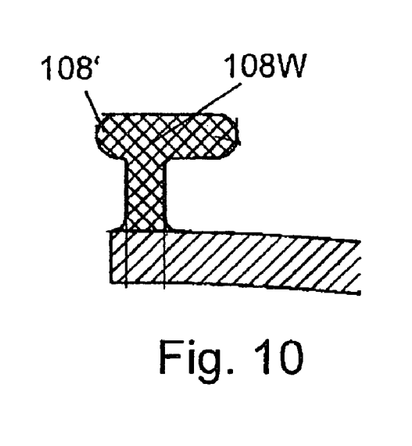
FIG. 10 shows a section along line X-X in FIG. 9.
Figure 11:
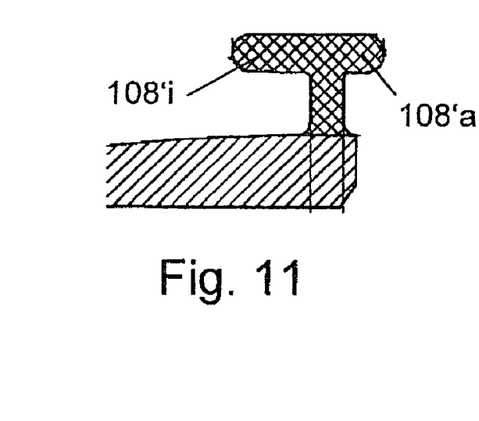
FIG. 11 shows a section along line XI-XI in FIG. 9.

Two connecting surfaces 111 and 112 are formed between the pivot axis 106 of the air mixer vent 105 and the partial cylinder, the connecting surface 111, which is illustrated on the left in FIG. 5, being arranged approximately at the end of the partial cylinder while the upper connecting surface 112 is arranged spaced apart, in the present case at approximately 25% of the entire length of the air mixer vent 105, from the other end of the partial cylinder. In this case—in accordance with the first exemplary embodiment—on the end side of the connecting surface 112 a wall 113 is formed running parallel to the pivot axis 106 in an outer region as far as the lug 110 (cf. FIG. 5), the wall 113 not being oriented in the radial direction but rather being oriented inclined at an angle of below 90° with respect to the tangential plane of the partial cylinder in the region in which partial cylinder and wall 113 meet.

On the partial cylinder inner surface, an air deflector element 115 is formed between the two connecting surfaces 112 and 111, said air deflector element running parallel to the pivot axis 106 and being formed inclined at an angle α of 30° to the radial direction toward the hot air duct W. In the present case, the length is approx. 40 mm, i.e. approximately half of the radius of the partial cylinder. The air deflector element 115 is arranged on the cylinder inside in a manner such that it is offset outward somewhat from the edge 108K (see FIG. 8).

Over the length of the air deflector element 115, two supporting ribs 116, which extend in the radial direction, are distributed in the longitudinal direction of the pivot axis between the two connecting surfaces 111 and 112. The supporting ribs 116 end in the region of the free end of the air deflector element 115, with them ending spaced apart from the air deflector element 115 in the radial direction with respect to the pivot axis 106, i.e. perpendicular to the partial cylinder.

The invention claimed is:

1. An air conditioning system for a motor vehicle comprising:
   an air distributor housing;
   an evaporator;
   a heater;
   a substantially partially cylindrical air mixer vent configured to pivot about a pivot axis between a hot air duct coming from the heater and a bypass duct coming directly from the evaporator and that controls the pivot axis; and
   an air deflector element arranged on an inner surface of a partial cylinder of the air mixer vent and protruding from the inner surface of the partial cylinder,
   wherein the pivot axis is arranged in a direction of flow downstream of the partial cylinder,
   wherein the air deflector element is configured to run parallel to the pivot axis and includes an angle (α) of 5° to 45° to a radial direction with respect to the pivot axis, and
   wherein the air deflector element includes a length of at maximum and at minimum one fifth of the radius of the partial cylinder when a center axis and the pivot axis coincide.

2. The air conditioning system as claimed in claim 1, wherein the air deflector element includes the angle (α) of 10° to 40°, to the radial direction with respect to the pivot axis.

3. The air conditioning system as claimed in claim 2, wherein apart from the base region, the air deflector element is straight.

4. The air conditioning system as claimed in claim 2, wherein apart from the base region, the air deflector element has a constant thickness.

5. The air conditioning system as claimed in one claim 1, wherein a transition from the air mixer vent to the air deflector element is rounded in a base region.

6. The air conditioning system as claimed in claim 1,
   wherein the air deflector element is designed such that it runs between two connecting surfaces of the air mixer vent, and
   wherein the connecting surfaces run perpendicular to the pivot axis.

7. The air conditioning system as claimed in claim 6, wherein at least one of the connecting surfaces is arranged spaced apart from the corresponding end of the air mixer vent.

8. The air conditioning system as claimed in claim 1, wherein the air deflector element is configured to be displaced in a direction of the hot air duct.

9. The air conditioning system as claimed in claim 1, wherein the air deflector element is arranged such that the air deflector element runs in relation to the radial direction toward the hot air duct.

10. The air conditioning system as claimed in claim 1, wherein at least one rib is arranged between a curved surface of the air mixer vent and the air deflector element.

11. The air conditioning system as claimed in claim 1, wherein the heating and/or air conditioning system comprises at least one of the following components: filter, mixing chamber, one or more flow ducts and one or more control vents for distributing the air to outlet ducts.

12. The air conditioning system as claimed in claim 1, wherein the air deflector element has a length which corresponds +/−50% to the distance of the air deflector element in a straight line from the closer end of the air mixer vent, which end runs in the direction of the pivot axis.

13. The air conditioning system as claimed in claim 12, wherein the air deflector element has a length which corresponds +/−20% to the distance of the air deflector element in a straight line from the closer end of the air mixer vent, which end runs in the direction of the pivot axis.

* * * * *